United States Patent
Wang et al.

(10) Patent No.: US 9,273,244 B2
(45) Date of Patent: Mar. 1, 2016

(54) METHOD OF PREPARING FLUORESCENT NANOPARTICLES

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Chun Wang, Beijing (CN); Feng Qin, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/368,361

(22) PCT Filed: Dec. 5, 2013

(86) PCT No.: PCT/CN2013/088576
§ 371 (c)(1),
(2) Date: Jun. 24, 2014

(87) PCT Pub. No.: WO2014/190709
PCT Pub. Date: Dec. 4, 2014

(65) Prior Publication Data
US 2015/0218447 A1    Aug. 6, 2015

(30) Foreign Application Priority Data

May 31, 2013    (CN) .......................... 2013 1 0214898

(51) Int. Cl.
*C09K 11/88*    (2006.01)

(52) U.S. Cl.
CPC .............. *C09K 11/883* (2013.01); *C09K 11/88* (2013.01)

(58) Field of Classification Search
CPC .. C09K 11/883; C09K 11/565; C09K 11/881; C09K 11/88; C01B 19/007; C01B 19/002; C01B 17/20; C01P 2004/64; C01P 2006/60; C01G 9/08
USPC ............. 252/301.6 S; 977/773, 700, 824, 762
See application file for complete search history.

(56) References Cited

U.S. PATENT DOCUMENTS

| | | | |
|---|---|---|---|
| 2006/0028882 A1* | 2/2006 | Qu .......................... | 365/189.07 |
| 2007/0034833 A1* | 2/2007 | Parce et al. .............. | 252/301.36 |
| 2011/0033368 A1* | 2/2011 | Ye et al. ........................ | 423/509 |
| 2013/0048922 A1 | 2/2013 | Zhou et al. | |

FOREIGN PATENT DOCUMENTS

| CN | 103275724 A | 9/2013 |
|---|---|---|
| WO | 2011/140700 A1 | 11/2011 |
| WO | WO 2011140700 A1 * | 11/2011 |

OTHER PUBLICATIONS

Jaehoon Lim, et al; "Inp@ZnSeS, Core@Composition Gradient Shell Quantum Dots with Enhanced Stability", Chemistry of Materials, vol. 23, Sep. 30, 2011, pp. 4459-4463.
Chun Wang; Green Chemical Routes to Selenium Compound Semiconductor Dots:, A Dissertation Submitted to Hefei University of Technology for the Degree of Doctor of Philosophy, Sep. 2009, 135 pages.
First Chinese Office Action dated Mar. 19, 2014; Appl. No. 201310214898.8.
Second Chinese Office Action dated Aug. 6, 2014; Appln. No. 201310214898.8.
International Search Report dated Dec. 2, 2014; PCT/CN2013/088576.
Junpeng Lu, et al; "Optical and electrical applications of $ZnS_xSe_{1-x}$ nanowires-network with uniform and controllable stoichiometry", Nanoscale Issue 3, pp. 976-981; First published online Jan. 11, 2012.
Written Opinion of the International Searching Authority dated Feb. 17, 2014; PCT/CN2013/088576.

\* cited by examiner

*Primary Examiner* — Matthew E Hoban
*Assistant Examiner* — Lynne Edmondson
(74) *Attorney, Agent, or Firm* — Ladas & Parry LLP

(57) ABSTRACT

Disclosed is a method of preparing fluorescent nanoparticles of $ZnSe_xS_{1-x}(0<x<1)$ comprising: mixing selenium powders, and sulfur powders with octadecylene, heating and stirring the mixture to dissolve the selenium powders, and the sulfur powders, and then cooling the mixture to give a first precursor solution comprising selenium and sulfur elements; mixing zinc oxide, oleic acid or lauric acid, octadecylene, and benzophenone, heating and stirring the mixture to dissolve the zinc oxide to give a second precursor solution comprising zinc element; adding the first precursor solution into the second precursor solution to undergo a reaction at a temperature of from 270° C. to 290° C. for a time of from 5 min to 10 min; pouring the reaction solution into a polar organic solvent to precipitate a raw product; washing and isolating the precipitate by centrifugation, and then dissolving the isolated materials with a non-polar organic solvent to give nanoparticles of $ZnSe_xS_{1-x}(0<x<1)$.

5 Claims, 2 Drawing Sheets

METHOD OF PREPARING FLUORESCENT NANOPARTICLES

TECHNICAL FIELD

Embodiments of the present invention relates to a method of preparing $ZnSe_xS_{1-x}$ ($0<x<1$) fluorescent nanoparticles.

BACKGROUND

Display apparatus or display using fluorescent nanoparticles has been reported in the prior art. Currently, fluorescent nanoparticles as commonly used are primarily those containing Cd, such as, CdSe, CdS, CdTe, and the like. Cd is a noble metal and likely to result in an environmental contamination. The presence of Cd in displayer is strictly preserved by the European Union (EU). Consequently, zinc-containing nanoparticles including ZnSe, ZnS, and the like tend to be interested. The fluorescent characteristics of such zinc-containing nanoparticles are similar to nanoparticles of Cd-containing compounds, namely, they have an emission wavelength that is adjustable in the visible range, a relatively narrow emission half-peak width, a purer color of the emission light, and a broader color range of the thus-prepared display.

In current reports, the synthesis of $ZnSe_xS_{1-x}$ ($0<x<1$) nanoparticles (e.g., Chem. Mater., 2011, 23. pp 4459-4463. Physical Inorganic Chemistry, 2005, 36. Vol. 2) tends to utilize organophosphine oxides, such as, trioctylphosphine oxide (TOPO), trioctylphosphine (TOP), tetrabutylphosphoric acid (TBP), etc. as solvent and surfactant to prepare $ZnSe_xS_{1-x}$ ($0<x<1$) nanoparticles under water-free and oxygen-free conditions. Although such synthesis scheme can result in high-quality $ZnSe_xS_{1-x}$ ($0<x<1$) nanoparticles having excellent monodispersity, the organic solvents used in this scheme including TOPO, TOP, TBP, etc., are inflammable, explosive, expensive, and relatively toxic. Such scheme has high comprehensive cost, need to be operation in glove boxes, and thus is not favorable for large-scale production.

SUMMARY

To addressing the above problems, embodiments of the present invention provides a method of preparing $ZnSe_xS_{1-x}$ fluorescent nanoparticles wherein $0<x<1$ comprising:

S1-1: in accordance with the molar of selenium to sulfur in the $ZnSe_xS_{1-x}$ nanoparticles, mixing selenium powders, and sulfur powders with octadecylene, heating and stiffing the mixture to dissolve selenium powders, and sulfur powders, and then cooling the mixture to give a first precursor solution comprising selenium and sulfur elements;

S1-2: mixing zinc oxide, oleic acid or lauric acid, octadecylene, and benzophenone, heating and stirring the mixture to dissolve the zinc oxide to give a second precursor solution comprising zinc element;

S2: in accordance with a molar ratio of zinc, selenium, and sulfur in the $ZnSe_xS_{1-x}$ nanoparticles, adding the first precursor solution into the second precursor solution to undergo a reaction at a temperature of from 270° C. to 290° C. for a time of 5 min to 10 min to form a reaction solution; and S3: pouring the reaction solution into a polar organic solvent to precipitate a raw product, washing and isolating the precipitate by centrifugation, and then dissolving the isolated materials with a non-polar organic solvent to give nanoparticles of $ZnSe_xS_{1-x}$.

In an aspect, the molar ratio of zinc oxide, oleic acid or lauric acid, octadecylene, and benzophenone in S1-2 can be 1:10:3:0.3.

In another aspect, the molar ratio of selenium powders, sulfur powders, and octadecylene in S1-1 can be (1 to 9):(9 to 1):(14 to 42).

In still another aspect, the polar organic solvent can be methanol, ethanol or propanol.

In still another aspect, the non-polar organic solvent can be toluene or n-hexane.

In still another aspect, the temperature of the second precursor solution can be maintained at 290° C. to 310° C.

Figure 1:
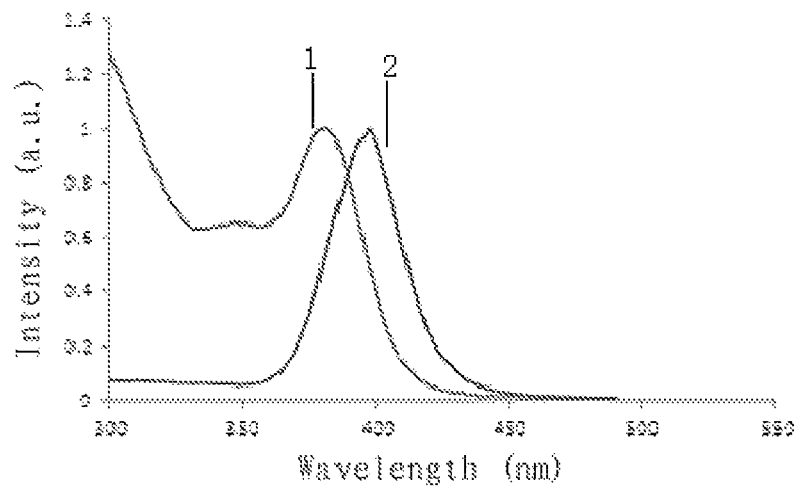
FIG. 1 represents the absorption spectrum and the fluorescence emission spectrum of $ZnSe_{0.1}S_{0.9}$ nanoparticles.

In these figures, the reference sighs represent the following meanings: 1—. Absorption Spectrum; and 2—. Emission Spectrum.

DETAILED DESCRIPTION

An embodiment of the present invention provides a method of preparing $ZnSe_xS_{1-x}$ ($0<x<1$) nanoparticles comprising:

S1-1: in accordance with a molar ratio of selenium to sulfur in the $ZnSe_xS_{1-x}$ nanoparticles, mixing selenium powders, and sulfur powders with octadecylene, heating and stirring the mixture to dissolve the selenium powders, and the sulfur powders, and then cooling the mixture to give a first precursor solution comprising selenium and sulfur elements;

S1-2: mixing zinc oxide, oleic acid or lauric acid, octadecylene, and benzophenone, heating and stirring the mixture to dissolve the zinc oxide to give a second precursor solution comprising zinc element;

S2: in accordance with the molar ratio of zinc, selenium, and sulfur in the $ZnSe_xS_{1-x}$ nanoparticles, adding the first precursor solution into the second precursor solution at a temperature of from 270° C. to 290° C. for a time of 5 min to 10 min to form a reaction solution; and S3: pouring the reaction solution into a polar organic solvent to precipitate a raw product, washing and isolating the precipitate by centrifugation, and then dissolving the isolated materials with a non-polar organic solvent to give the $ZnSe_xS_{1-x}$ nanoparticles.

In the method of preparing $ZnSe_xS_{1-x}$ ($0<x<1$) nanoparticles of the embodiments of the present invention, the octadecylene can dissolve the selenium powders, and the sulfur powders, and form a complex, together with the selenium powders, and the sulfur powders. The oleic acid or lauric acid can be reacted with zinc oxide to produce zinc oleate compound or zinc laurate compound. At a high temperature, the precursor solution of the selenium powders, and the sulfur powders can be reacted with the zinc oleate compound or the zinc laurate compound to produce the nanoparticles of the ternary compound of selenium-sulfur-zinc (i.e., $ZnSe_xS_{1-x}$ ($0<x<1$)).

By modifying the molar ratio of Se to S, $ZnSe_xS_{1-x}$ ($0<x<1$) nanoparticles with different stoichiometric ratios can be produced, and such nanoparticles have an emission spectrum in a wavelength range of from 390 to 450 nm and an emission half-peak width of from 35 to 45 nm.

In an aspect, the molar ratio of zinc oxide, oleic acid or lauric acid, octadecylene, and benzophenone in S1-2 is preferably 1:10:28:0.3. Moreover, this molar ratio can vary in a range of ±20%. Different molar ratios will affect otherwise the optical characteristics of product.

In another aspect, the molar ratio of selenium powders, sulfur powders, and octadecylene in S1-1 can be (1 to 9):(9 to 1):(14 to 42).

In still another aspect, the polar organic solvent can be methanol, ethanol or propanol.

In still another aspect, the non-polar organic solvent can be toluene or n-hexane.

In still another aspect, the temperature of the second precursor solution can be maintained at 290° C. to 310° C.

In comparison with the prior art method of preparing $ZnSe_xS_{1-}(0<x<1)$ nanoparticles, the methods of embodiments of the present invention have the following advantages: Octadecylene exhibits good solubility of selenium powders, and sulfur powders, and thus can substitute high toxic and expensive organophosphine compounds used in the prior art, thereby achieving environment-friend and non-toxic chemosynthesis. In addition, the oleic acid or lauric acid and octadecylene as used further have anti-oxidizable and high temperature (315° C.)-resistant properties, so that the anti-oxidization means of inert gas protection can be eliminated, and the $ZnSe_xS_{1-}(0<x<11)$ nanoparticles can the synthesized in an open system, thereby simplifying and facilitating the operation. Moreover, such preparation method has many advantages suitable for industrial products, such as, simple operation, good repeatability, low cost, low toxicity, and the like. The produced fluorescent nano-materials contain no heavy metal, and have a good fluorescent emission characteristic For describing the object, technical solutions and advantages of the present invention more clearly, the present invention is further illustrated in details with reference to the drawings and examples. It is understood that the examples as described herein are only for the purpose of illustrating the present invention, and does not limit the scope of the present invention.

Hereinafter the examples are used to illustrate the $ZnSe_xS_{1-}(0<x<1)$ nanoparticles produced with different molar ratios of Se to S.

EXAMPLE 1

Preparation of $ZnSe_{0.1}S_{0.9}$ Nanoparticles 0.1 mmol of selenium powders, 0.9 mmol of sulfur powders, and 5 ml of octadecylene (14 mmol) were mixed and heated under magnetic agitation under the selenium powders, and the sulfur powders were dissolved. Then, the mixture was cooled to room temperature (RT) to produce a first precursor solution comprising selenium and sulfur elements.

1 mmol of zinc oxide, 10 mmol of oleic acid, 10 ml of octadecylene (28 mmol) and 0.5 mmol of benzophenone were mixed and heated to a temperature of 270° C., and dissolved under magnetic agitation to form a second precursor solution comprising zinc element. Then, the mixture was maintained a temperature of 290° C.

The first precursor solution was quickly added into the second precursor solution, and the mixed solution was maintained at a temperature of 270° C.

After 5 min of reaction, the reaction solution was poured into methanol to precipitate a raw product. The precipitate was washed three times, isolated by centrifugation, and dissolved with toluene, thereby producing $ZnSe_{0.1}S_{0.9}$ nanoparticles.

The absorption spectrum and the fluorescent emission spectrum of $ZnSe_{0.1}S_{0.9}$ nanoparticles are shown as the Absorption Spectrum 1 and the Fluorescent Spectrum 2 of FIG. 1. The resultant $ZnSe_{0.1}S_{0.9}$ nanoparticles have a sharp fluorescent emission peak around 400 nm. This indicates that the resultant $ZnSe_{0.1}S_{0.9}$ nanoparticles have a relatively good fluorescent characteristic.

EXAMPLE 2

Preparation of $ZnSe_{0.3}S_{0.7}$ Nanoparticles 0.3 mmol of selenium powders, 0.7 mmol of sulfur powders, and 8 ml of octadecylene (22.4 mmol) were mixed and heated under magnetic agitation until the selenium powders, and the sulfur powders were dissolved. Then, the mixture was cooled to RT to produce a first precursor solution comprising selenium and sulfur elements.

1 mmol of zinc oxide, 10 mmol of oleic acid, 10 ml of octadecylene, and 0.5 mmol of benzophenone and heated to a temperature of 310° C. The mixture was dissolved under magnetic agitation to form a second precursor solution comprising zinc element. Then, the mixture was maintained a temperature of 310° C.

The first precursor solution was quickly added into the second precursor solution, and the mixed solution was maintained at a temperature of 290° C.

After 10 min of reaction, the reaction solution was poured into ethanol to precipitate a raw product. The precipitate was washed three times, isolated by centrifugation, and dissolved with n-hexane, thereby producing $ZnSe_{0.3}S_{0.7}$ nanoparticles.

Figure 2:
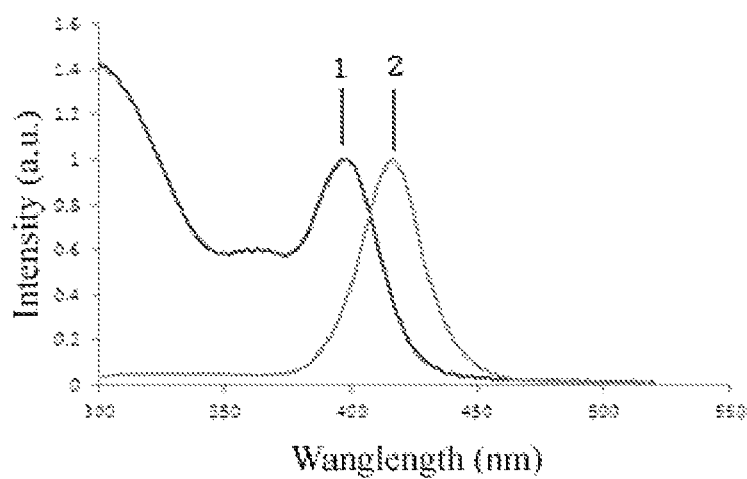
FIG. 2 represents the absorption spectrum and the fluorescence emission spectrum of $ZnSe_{0.3}S_{0.7}$ nanoparticles.

The absorption spectrum and the fluorescent emission spectrum of $ZnSe_{0.3}S_{0.7}$ nanoparticles are shown as the Absorption Spectrum 1 and the Fluorescent Spectrum 2 of FIG. 2. The resultant $ZnSe_{0.3}S_{0.7}$ nanoparticles have a sharp fluorescent emission peak around 415 nm. This indicates that the resultant $ZnSe_{0.3}S_{0.7}$ nanoparticles have a relatively good fluorescent characteristic.

EXAMPLE 3

Preparation of $ZnSe_{0.7}S_{0.3}$ Nanoparticles 0.7 mmol of selenium powders, 0.3 mmol of sulfur powders, and 12 ml of octadecylene (33.5 mmol) were mixed and heated under magnetic agitation until selenium powders, and sulfur powders were dissolved. Then, the mixture was cooled to RT to produce a first precursor solution comprising selenium and sulfur elements.

1 mmol of zinc oxide, 10 mmol of oleic acid and 10 ml of octadecylene, and 0.5 mml benzophenone were mixed and heated to 290° C. The mixture was dissolved under magnetic agitation to form a second precursor solution. Then, the mixture was maintained at a temperature of 300° C.

The first precursor solution was quickly added into the second precursor solution, and the mixed solution was maintained at a temperature of 280° C.

After 10 min of reaction, the reaction solution was poured into methanol to precipitate a raw product, The precipitate was washed three times, isolated by centrifugation, and then dissolved with toluene, thereby producing $ZnSe_{0.7}S_{0.3}$ nanoparticles.

Figure 3:
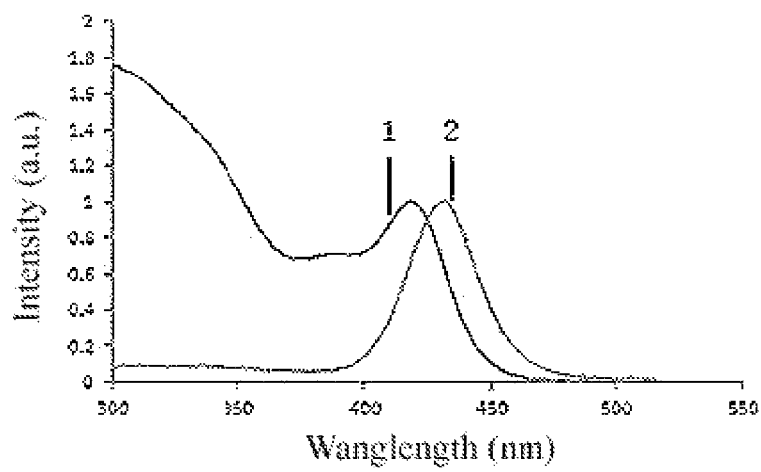
FIG. 3 represents the absorption spectrum and the fluorescence emission spectrum of $ZnSe_{0.7}S_{0.3}$ nanoparticles.

The absorption spectrum and the fluorescent emission spectrum of $ZnSe_{0.7}S_{0.3}$ nanoparticles are shown as the Absorption Spectrum 1 and the Fluorescent Spectrum 2 of FIG. 3. The resultant $ZnSe_{0.7}S_{0.3}$ nanoparticles have a sharp fluorescent emission peak around 440 nm. This indicates that the resultant ZnSe$_{0.7}$S$_{0.3}$ nanoparticles have a relatively good fluorescent characteristic.

EXAMPLE 4

Preparation of ZnSe$_{0.9}$S$_{0.1}$ Nanoparticles 0.9 mmol of selenium powders, 0.1 mmol of sulfur powders, and 15 ml of octadecylene (42 mmol) were mixed and heated under magnetic agitation until selenium powders, and sulfur powders were dissolved. Then, the mixture was cooled to RT to produce a first precursor solution comprising selenium and sulfur elements.

1 mmol of zinc oxide, 10 mmol of lauric acid, 10 ml of octadecylene, and 0.5 mml benzophenone were mixed and heated to 300° C. The mixture was dissolved under magnetic agitation to form a second precursor solution. Then, the mixture was maintained at a temperature of 300° C.

The first precursor solution was quickly added into the second precursor solution, and the mixed solution was maintained at a temperature of 280° C.

After 5 min of reaction, the reaction solution was poured into ethanol to precipitate a raw product, The precipitate was washed three times, isolated by centrifugation, and then dissolved with n-hexane, thereby producing ZnSe$_{0.9}$S$_{0.1}$ nanoparticles.

Figure 4:
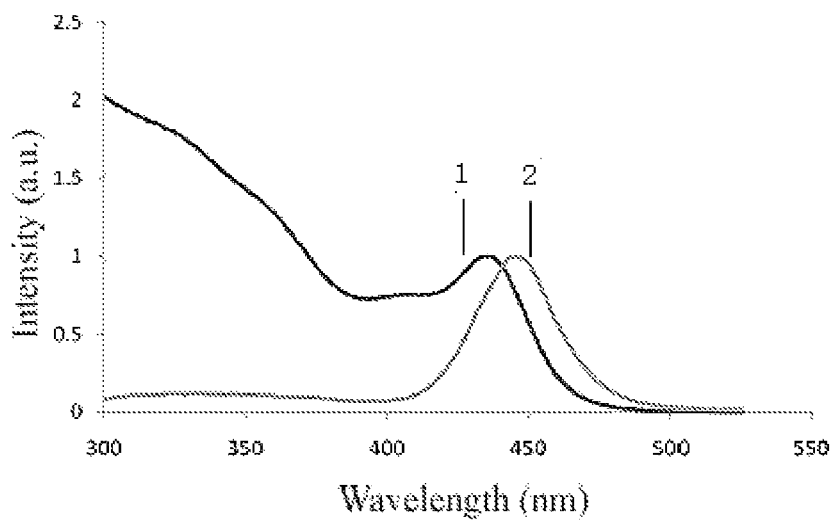
FIG. 4 represents the absorption spectrum and the fluorescence emission spectrum of $ZnSe_{0.9}S_{0.1}$ nanoparticles.

The absorption spectrum and the fluorescent emission spectrum of ZnSe$_{0.9}$S$_{0.1}$ nanoparticles are shown as the Absorption Spectrum 1 and the Fluorescent Spectrum 2 of FIG. 4. The resultant ZnSe$_{0.9}$S$_{0.1}$ nanoparticles have a sharp fluorescent emission peak around 450 nm. This indicates that the resultant ZnSe$_{0.9}$S$_{0.1}$ nanoparticles have a relatively good fluorescent characteristic.

The aforesaid examples are merely provided to illustrate the present invention better, and do not tend to limit the present invention. Any modification, equivalent substitution, and improvement made in line with the spirit and principle of the present invention should be encompassed within the present invention.

The invention claimed is:

1. A method of preparing nanoparticles of ZnSe$_x$S$_{1-x}$ wherein 0<x<1, comprising:
   S1-1: in accordance with a molar ratio of selenium to sulfur in the nanoparticles ZnSe$_x$S$_{1-x}$, mixing selenium powders, and sulfur powders with octadecylene, heating and stirring the mixture to dissolve the selenium powders, and the sulfur powders, and cooling the mixture to give a first precursor solution comprising selenium and sulfur elements;
   S1-2: mixing zinc oxide, oleic acid or lauric acid, octadecylene, and benzophenone, heating and stirring the mixture to dissolve the zinc oxide, to give a second precursor solution comprising zinc element, wherein a molar ratio of the zinc oxidg, the oigis acid or lauric acid, the octadecylene, and the benzophenone is 1:10:28:0.3;
   S2: in accordance with a ratio of zinc, selenium and sulfur in nanoparticles of ZnSe$_x$S$_{1-x}$, adding the first precursor solution into the second precursor solution and heating the resultant precursor solution mixture to allow the precursors to undergo a reaction at a temperature of from 270°C to 290° C. for a time of 5 min to 10 min to form a reaction solution; and
   S3: pouring the reaction solution into a polar organic solvent to precipitate a raw product, washing and isolating the precipitate by centrifugation, and then dissolving the isolated materials with a non-polar organic solvent to give nanoparticles of ZnSe$_x$S$_{1-x}$.

2. The method of claim 1, wherein in S1-1, the molar ratio of selenium powders, sulfur powders, and octadecylene is (1 to 9):(9 to 1):(14 to 42).

3. The method of claim 1, wherein the polar organic solvent is methanol, ethanol or propanol.

4. The method of claim 1, wherein the non-polar organic solvent is toluene or n-hexane.

5. The method of claim 1, wherein the second precursor solution has a temperature of from 290° C. to 310° C.

* * * * *